(12) United States Patent
Mathieu

(10) Patent No.: US 10,904,716 B1
(45) Date of Patent: Jan. 26, 2021

(54) WIRELESS AUDIO AND COMMUNICATION SYSTEM

(71) Applicant: Jabari Mathieu, Gardena, CA (US)

(72) Inventor: Jabari Mathieu, Gardena, CA (US)

( * ) Notice: Subject to any disclaimer, the term of this patent is extended or adjusted under 35 U.S.C. 154(b) by 0 days.

(21) Appl. No.: 15/272,403

(22) Filed: Sep. 21, 2016

Related U.S. Application Data

(60) Provisional application No. 62/221,474, filed on Sep. 21, 2015.

(51) Int. Cl.
*H04W 4/10* (2009.01)
*H04W 88/02* (2009.01)

(52) U.S. Cl.
CPC .............. *H04W 4/10* (2013.01); *H04W 88/02* (2013.01)

(58) Field of Classification Search
CPC ........... H04B 2001/3872; H04W 4/10; H04W 88/02; H04W 76/45
See application file for complete search history.

(56) References Cited

U.S. PATENT DOCUMENTS

| | | | | |
|---|---|---|---|---|
| 6,993,601 B2 * | 1/2006 | Minami | ................. | G06F 3/0613 235/486 |
| 7,904,061 B1 * | 3/2011 | Zaffino | ................. | G11B 27/105 455/414.1 |
| 8,971,946 B2 * | 3/2015 | Ahmed | ................ | H04W 76/005 455/518 |
| 2003/0032407 A1 * | 2/2003 | Mages | ..................... | H04M 1/66 455/411 |
| 2004/0015548 A1 * | 1/2004 | Lee | ....................... | H04L 12/1827 709/204 |
| 2004/0223599 A1 * | 11/2004 | Bear | ...................... | H04M 3/436 379/207.02 |
| 2005/0245203 A1 * | 11/2005 | Vance | ...................... | H04B 1/46 455/79 |
| 2006/0040644 A1 * | 2/2006 | Gibbs | ..................... | H04L 51/38 455/412.1 |
| 2006/0168640 A1 * | 7/2006 | Anttila | ................... | H04H 20/93 725/135 |
| 2010/0022269 A1 * | 1/2010 | Terlizzi | ................... | H04M 1/05 455/556.1 |
| 2013/0290435 A1 * | 10/2013 | Martin | ................... | H04L 51/28 709/206 |
| 2014/0073433 A1 * | 3/2014 | Phang | ................... | A63F 13/327 463/40 |
| 2014/0323183 A1 * | 10/2014 | Klein | ..................... | H04B 1/385 455/569.1 |
| 2017/0034673 A1 * | 2/2017 | Chong | .................... | H04W 4/10 |

* cited by examiner

*Primary Examiner* — Raymond S Dean
(74) *Attorney, Agent, or Firm* — Schrantz Law Firm, PLLC; Stephen D. Schrantz

(57) ABSTRACT

The system allows audio communication through the use of a wireless headset with speaker, microphone, and push-to-talk capabilities. The user communicates with individuals or pre-established groups through the push of a headset button connected a cellular phone or other capable device. Users may listen to music and communicate with one another without requiring separate programs through the present invention. If music is playing when a user receives a communication, the music pauses, the message plays, and then the music resumes play.

3 Claims, 7 Drawing Sheets

| Unique User ID | User Name | Contact Information |
|---|---|---|
| JaneyD | Jane Doe | 866-555-5555 |
| JDoe_79 | John Doe | jdoe@provider.com |
| JMathieu | Jabari Mathieu | JMat@astate.edu |

FIG. 7

| Unique Group ID | Group Description | Unique User IDs |
|---|---|---|
| D0eFam | Doe Family Chat | JaneyD, JDoe_79 |
| D_Line | Defensive Line | JMathieu, Odom93, Grigg33, ITackleU, BigNasty |

FIG. 8

| Unique User ID | Locked |
|---|---|
| JaneyD | Y |
| JDoe_79 | N |
| JMathieu | N |

FIG. 9

WIRELESS AUDIO AND COMMUNICATION SYSTEM

CROSS-REFERENCE TO RELATED APPLICATIONS

This application claims priority to and is a continuation in part of U.S. Patent Application No. 62/221,474 filed on Sep. 21, 2015 entitled "WIRELESS AUDIO AND COMMUNICATION SYSTEM."

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to a method of audio communication through the use of a wireless headset with speaker, microphone, and push-to-talk capabilities. The present invention allows users to communicate with individuals or pre-established groups through the use of a wireless headset in communication with a cellular phone, computing device, smart phone, or other capable device. Users may listen to music or other audio media through the headset, and choose to allow or disallow communication capabilities through a lock function. Users may also listen to music and communicate with one another without requiring separate programs through the present invention.

II. Description of the Known Art

Patents and patent applications disclosing relevant information are disclosed below. These patents and patent applications are hereby expressly incorporated by reference in their entirety.

U.S. Publication No. 20080125042 to Kim ("the '042 publication") teaches a Bluetooth remote push to talk and hands-free communication system and method of providing the same. The '042 publication teaches a headset connected to a dongle that transmits a signal between a headset and handset. The headset receives as well as outputs audio signal received from the dongle. It also receives inputs of a user's voice and transmits that voice to a dongle. A push to talk button device transmits a signal to toggle the transmission and reception modes based on a user's manipulation of the dongle. This unit as a whole performs short-range wireless communication via Bluetooth.

SUMMARY OF THE INVENTION

The present invention is directed to a headset with voice capabilities connected to a mobile or music device with data or WiFi capabilities that enables users to communicate with users selected individually or within a group. The system allows one or two-way audio communication between users.

The user transmits/receives message(s) via an audio transceiver, such as a headset, earphones with microphone, a device with audio input and playback capabilities, or a combination of devices with audio playback and audio input capabilities. The audio transceiver provides a command input that accepts user's commands to transmit a message to the recipient(s), which may include a user or a group of users. The user of one embodiment identifies the recipients via an application running on the user's device.

The user sends an audio message to the recipient(s). The audio message is delivered to the recipient's device and played via the audio transceiver which includes a speaker. The speaker may include, but is not limited to, ear buds, headphones, personal speakers, wireless speakers, wired speakers, surround sound speakers, or other forms of speakers with or without microphone capabilities. If the recipient's speaker has microphone capabilities, the recipient may transmit a message to the users.

Users may listen to music on their device while continuing to utilize the present invention. If music is playing when a message is received, the music will pause while the device plays the message. The device plays the message without the requiring the user to play the message or request the device to play the message. The music resumes after the message is played.

Users have an option to lock the program in a privacy mode. Privacy mode prevents the user from receiving messages from users. Selecting the "privacy" option disables the receipt of messages. Any messages sent to a recipient who has entered privacy mode will not be played until the user exits privacy mode. In one embodiment, the messages are saved to be played after the user exits privacy mode.

Current communication programs do not allow users to listen to music and communicate with other users at the same time. The present invention allows individual users or groups of users to communicate freely using hands-free devices. The present invention allows users to communicate while performing a demanding task such as working out without removing earphones or traveling significant distances to either communicate with a person or access the controls of a communication system. The present invention also allows users to communicate while listening to music without removing earphones.

It is an object of the present invention to allow users to send audio communication to a single recipient or group of recipients.

It is another object of the present invention to provide users with the ability to communicate with one or more persons wirelessly from their Wi-Fi or data enabled device.

It is another object of the present invention to allow users to listen to music or other audio media and communicate without having to switch programs or applications.

It is another object of this invention to allow users to send and/or receive messages with little interaction with their phone or other computing device.

It is another object of this invention to provide a quick method of communicating with others.

It is another object of this invention to minimize the time required to send and/or receive messages between users or groups of user.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is a data view of one embodiment of the present invention;

FIG. 8 is a data view thereof; and

FIG. 9 is a data view thereof.

DETAILED DESCRIPTION

Figure 1:
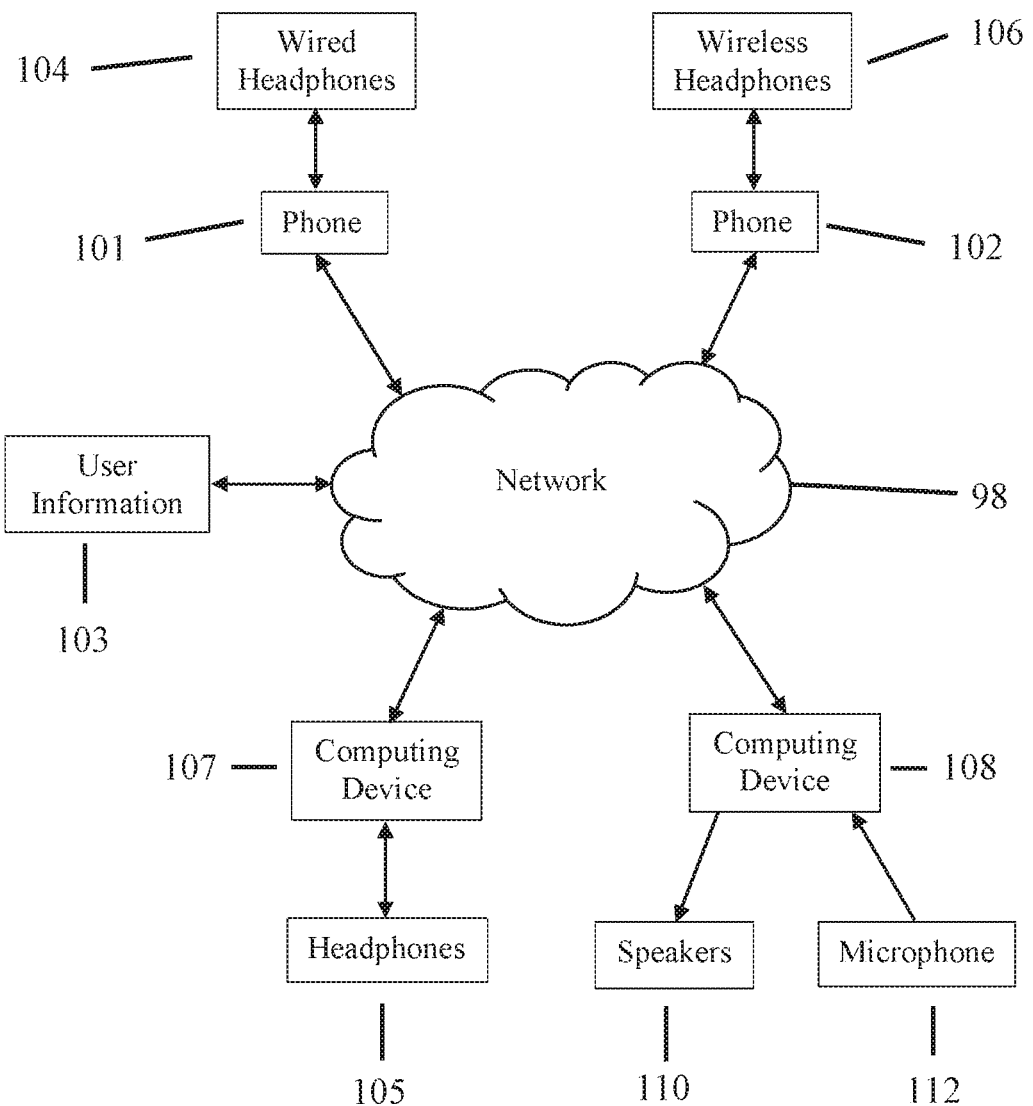
FIG. 1 is an environmental view showing one embodiment of the present invention.

FIG. 1 shows an environmental view of one embodiment of the present invention. FIG. 1 shows multiple devices 101, 102, 107, 108 communicating with one another over the Network 98. Devices 101, 102, 107, 108 may include but are not limited to cellular phones, smart phones, tablets, or computing devices. The users receive and transmit the voice messages using Devices 101, 102, 107, 108.

The user enters a command input via a command button. The command button may be a physical button implemented on the headphones, microphone, or the smart phone or computing device. The command button may also be a virtual button implemented as a digital button on the smart phone or other computing device. The user enters the talk command into the command input to activate the microphone. The command input communicates with the device to instruct the device to perform a particular function. The command input may be implemented on the headset or on the smart phone or computing device. The user operates the system by entering input through the command input. The input entered into the command input controls the operation of the device.

Devices 101, 102, 107, 108 transmit the users' messages received by the microphone. Devices 101, 102, 107, 108 transmit the messages to the recipients in real time, streams the message to the recipients, or records and transmits the message with delayed delivery. The computing devices 101, 102, 107, 108 transmit the message to the recipients via Network 98.

Network 98 serves as a communication path for transmitting the messages between users and recipients. Devices 101, 102, 107, 108 transmit and receive messages through Network 98. Devices 101, 102, 107, 108 of one embodiment provide audio playback device, such as a speaker, and an audio input device, such as a microphone, for playing and transmitting messages.

In another embodiment, devices 101, 102, 107, 108 communicate with personal hand free sets, such as Wired Headphones 104, Wireless Headphones 106, or Headphones 105 for playback and input of the audio message. Speakers 110 and microphone 112 may also communicate with computing device 108 for playback and input of the audio message. The Wired Headphones 104, Wireless Headphones 106, or Headphones 105 incorporate audio input capabilities, such as a microphone, for the user to input the message.

Wired Headphones 104, wireless headphones 106, headphones 105, and speakers 110 and microphone 112 connect to their respective devices 101, 102, 107, 108 for communication with the user. In one embodiment, wired headphones 104, wireless headphones 106, and headphones 105 provide an audio playback device that allows playing of the audio, such as a speaker, and an audio input such as a microphone. The user enters the message using the audio input of headphones 104, 106, 105 or audio input 112, such as microphone. Devices 101, 102, 107, 108 transmit the message from the user to the other recipients via Network 98.

If headphones are not available or the headphones do not provide an audio input, the user may use an audio input of devices 101, 102, 107, 108 if available. The audio input receives the message from the user for transmission. The use of the headphones allows hands free communication. However, the application may be used through the device as long as the device provides audio playback and audio input.

The message is transmitted through Network 98 to the selected recipient(s). The system identifies each user through a communication path, such as contact information. The system accesses User Information 103, such as the user's unique User ID, the User Name and the communication path (contact information). The system stores the user information 103 in data storage, such as a database. The user information 103 of one embodiment is stored remotely from the devices 101, 102, 107, 108 and accessible through Network 98. In another embodiment, user information 103 is stored locally on each device 101, 102, 107, 108.

The user selects the recipient(s) of the message. A recipient may be a single user or a group of users pre-selected by the user. If no recipient is selected, the message is sent to the recipient(s) the user last selected. Device 100 then transmits the message to recipient(s). In one embodiment, the user selects the recipient or group of recipients before inputting the message. The user may also input the message and then select the recipient or group of recipients.

Figure 2:
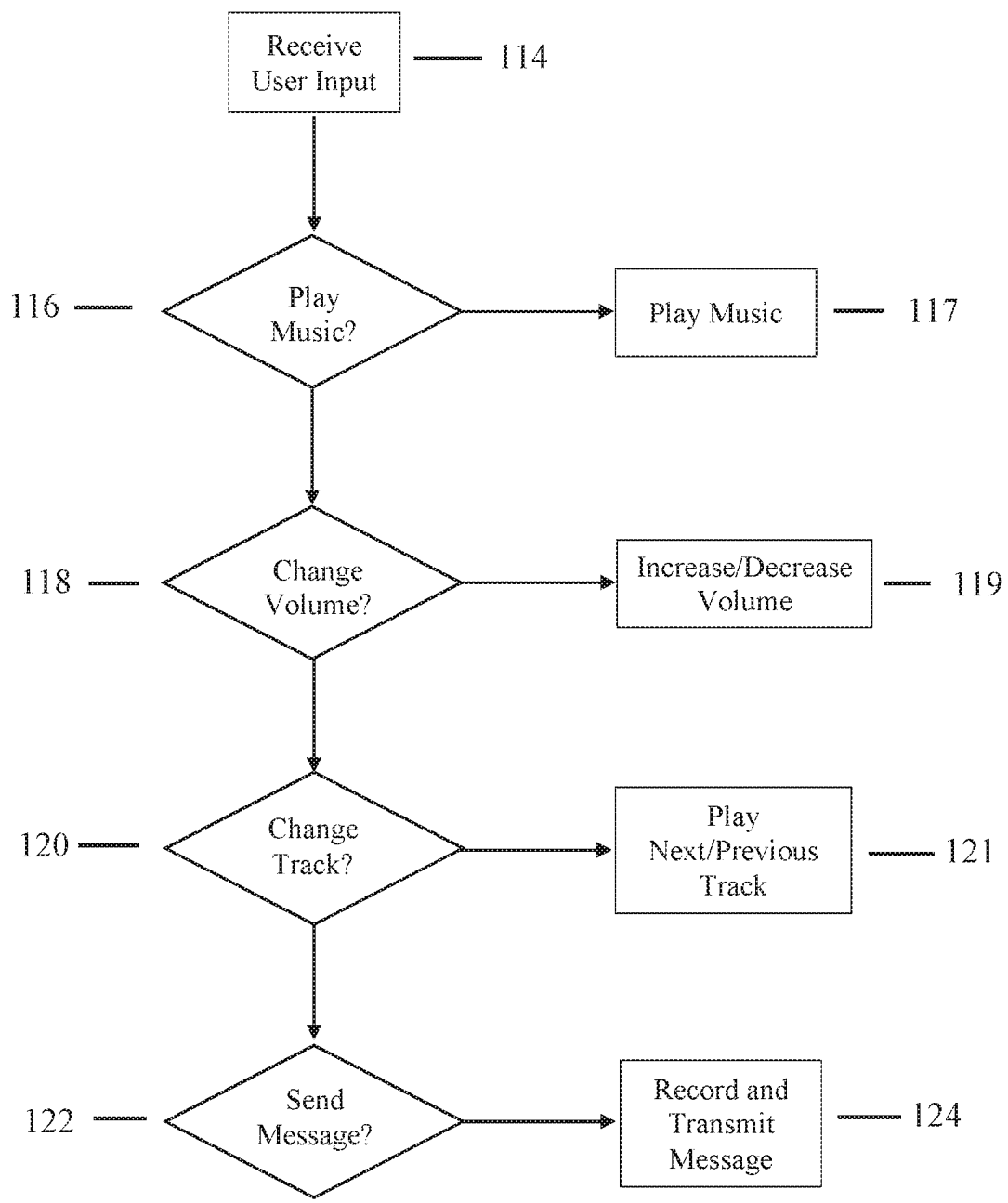
FIG. 2 is a flowchart showing a process of one embodiment of the present invention.

FIG. 2 shows a flowchart of a user inputting commands through command input, such as a command button or buttons. The headphones may provide command buttons for entering the commands. Such a command input may be implemented on the headphones or on the wire of the headphones. The command input may be a physical button placed on the headphones or the wire.

In other embodiments, the command input may be a virtual button on the smart phone or computing device. A virtual button may be assigned to particular commands. The virtual button may be assigned to such functions as playing music, talking with other users, etc.

Some existing Bluetooth devices allow touch audio control through a command input, such as a push button. This command input is a multifunctional tool that controls various functions of the devices 101, 102, 107, 108. The command input controls several functions, such as audio playback, increase and/or decrease volume, start and/or stop audio playback, start and stop music, change tracks in an album, play the next track, replay the track, play the previous track, increase and decrease volume, and transmit verbal messages or commands through the audio input device.

In an alternative embodiment, a headset specifically designed for the system communicates with Devices 101, 102, 107, 108. This headset is specifically designed for communication with the system. Such a headset provides a talk button which automatically sends the audio captured through the audio input to recipients. The user is not required to enter a special instruction to transmit a message through the system. Depressing the talk button enters the talk command as will be described below.

Each individual headset is programmed with command signals. The input received by the command input controls the manner in which the device functions. When the user enters a particular command into the command input, the device performs the function identified by the command input. Such functions include talk, change volume, change track, enter voice command, etc. The talk function sends the audio captured through the audio input to recipients. A designated input, such as a talk command, entered into the command input causes the device to enter talk mode. In talk mode, the system allows the user to select a recipient or group of recipients of the message, activates the audio input, and transmits the received audio to the recipient(s).

Different types of input correlate to different commands programmed within the headset. For example, pushing the command input once in the lower portion of the touch receiver may stop or start a track. Similarly, pushing the command input twice in the center may signal the headset to receive a voice command. Entering the talk command into the command input causes the system to enter talk mode.

The device receives a command at Receive User Input 114 through the command input. Based on the headset's configuration, specific input into the command input causes the device to perform a certain task. The device determines which command was entered into the command input. The different functions are shown in FIG. 2. The system determines the command that was entered and functions accordingly. In one embodiment, the system allows command inputs such as play command, change volume command, change track command, and the talk command.

If the user wished to play an audio track at Play Music 116, the user enters the play command into command input. The play command signals the user's device to play music. The command input instructs the device to play music. The device determines that the command input is the play command at play music query 116. The device then plays the music through the audio playback at Play Music 117. The user may also enter a stop command or pause command to pause or stop the playing of music.

A user may also enter a change volume command into the command input. The change volume command signals the user's device to change volume of the audio playback. The command input instructs the device to either increase or decrease the volume depending on the command input. The device determines that the command input is a change volume command at Change Volume query 118. The command is then transmitted to the user's device to change the volume. The device will Increase or Decrease the Volume as directed by the user at Increase/Decrease Volume 119.

A user may also enter a change track command into the command input. The change track command signals the user's device to change the track that is playing. The command input instructs the device to play the next track or play a previous track depending on the command input. The device determines that the command input is a change track command at Change Track query 120. The command is then transmitted to the user's device to change the track. The device will play the next track or play the previous track as directed by the user at Play Next/Previous Track 121.

Likewise, the user may wish to record and send a message at talk function 124. The user enters a talk command into the command input. The talk command signals the user's device to initiate the talk function to transmit a message to recipient(s). The talk command instructs the device to activate the audio input to receive the audio message and transmit the message to the recipients. The device determines that the command input is a talk command at Send Message query 122. The user's device, including but not limited to the smart phone, tablet, or computing device, activates the audio input to receive and record the message for transmission to the recipient(s) at the talk function 124. The device transmits the message after the user has finished speaking the message into the audio input.

In one embodiment, the device continues to record the message until the user releases the command input for the talk command. In another embodiment, the user enters a second input command input indicating that the user's message is finished and ready for transmission. In another embodiment, the smart phone assigns a specific virtual button to the talk command. The user presses the virtual button assigned to the talk command. The user presses the talk button to input the message to be transmitted. The user releases the talk button to indicate the end of the message to be transmitted.

Figure 3:
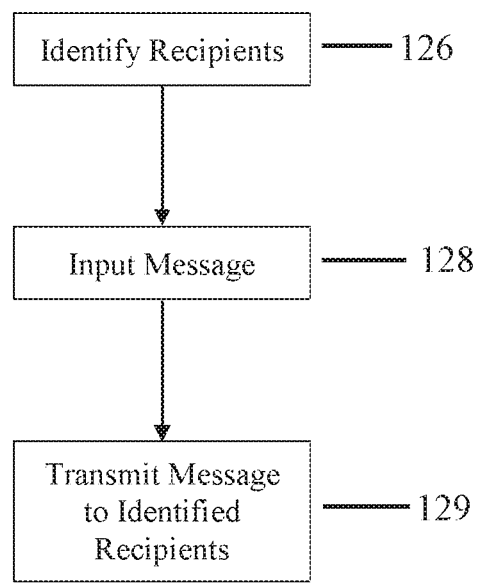
FIG. 3 is a flowchart showing a process of one embodiment of the present invention.
Figure 5:
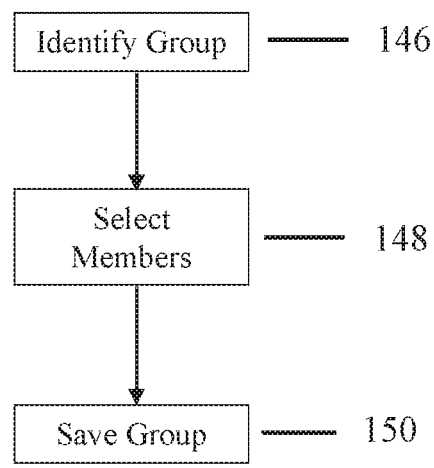
FIG. 5 is a flowchart showing a process of one embodiment of the present invention.

FIG. 3 shows a flowchart of a message being sent from a user through the network to another user. Within the application, the user may identify recipients at Identify Recipients 126 for the user's audio message. The user may select a single recipient, multiple recipients, or a group of recipients. In one embodiment Groups are pre-established by the user within the system of Device. FIG. 5 shows a method of establishing a group of recipients in more detail.

In one embodiment, the user defines a default operation for the device to operate when a user does not select a recipient. Prior to sending the message, the user establishes the default operation that identifies a specific recipient, recipients, or group to which the message will be automatically sent if the user does not select a recipient. The default operation of the device may be configured prior to the user entering the transmit message command. The user can configure the default operation to transmit messages to selected recipient(s) and/or group(s). The user could also configure the default operation to transmit messages to the recipient, recipients, or group from which the user last received a message if no recipient is selected. The user could configure the default operation to transmit messages to the recipient, recipients, or group to which the user last sent a message if no recipient is selected. In another embodiment, the system transmits the message to the last recipient(s) with which the user has communicated. For example, the system will send the message to the recipient involved with the latest communication (either a received message or a sent message, whichever is latest). The system transmits the message to the recipient(s) and/or group(s) depending upon the configuration of the default operation if no user is selected.

In one embodiment, the system maintains a message log of the sender and recipient of the messages transmitted and received by the user. The message log maintains a last correspondence record indicating the latest correspondence of the user. The latest correspondence is the most recent correspondence either transmitted by the user or received by the user, whichever is latest. The last correspondence record indicates the recipients of the latest correspondence and the sender of the latest correspondence. The system transmits the current message of the user to the recipients and sender (unless the sender is the current sender) of the last correspondence if the user does not select any recipients.

The system accesses contact information to contact each recipient. The contact information provides a communication path for the system to contact the recipient. The contact information may be stored locally or remotely from the devices 101, 102, 107, 108. The user may select the recipient, recipients, or group to which the message will be transmitted. The user may specifically select the recipient(s)/group or the user can use the default selection by not selecting recipients.

The user inputs the message through an audio input, such as a microphone enabled device at input message 128. The user may also enter the message first and then select the recipient(s)/group. The device may continue to transmit the message input from the user until the system detects silence or a pause for a specific time period, the end message signal. The user may also enter a command through command input indicating that the user has finished the message. As indicated above, the command input may be a separate command indicating end of the message or the command input may be releasing the talk button.

The microphone transmits the message to the user's device, including the smart phone, tablet, or other computing device. The user's device identifies the contact information for each recipient. The device then transmits the message to the contact information associated with each recipient's device. The sender's device transmits the message through the network to each recipient's device through network 98. The network identifies the communication path needed to contact each recipient through the contact information associated with the selected recipient or recipients. Once the device has been identified, the network then Transmits Message to Identified Recipients 129.

Figure 4:
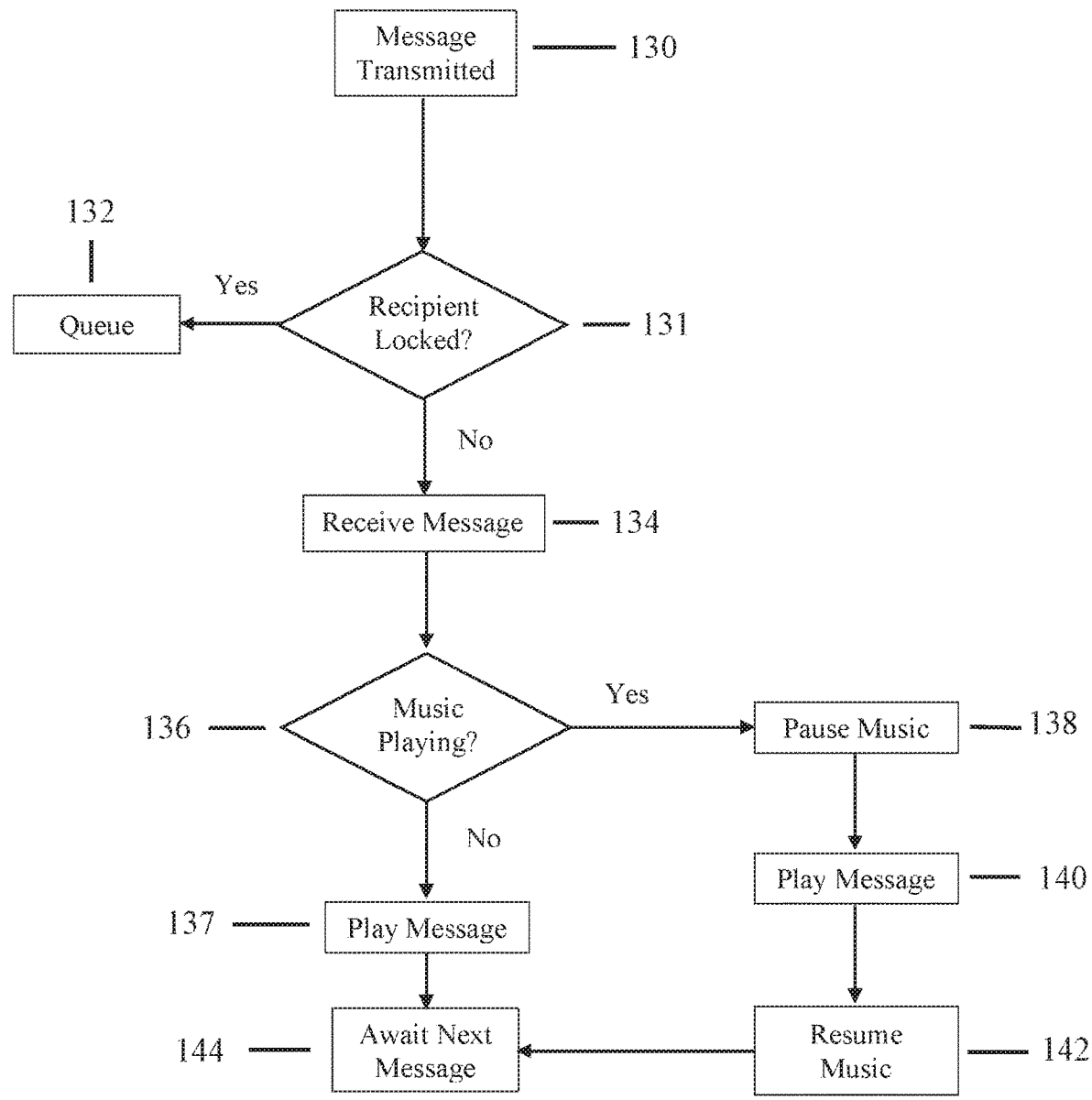
FIG. 4 is a flowchart showing a process of one embodiment of the present invention.

FIG. 4 shows the process of a user receiving a message in one embodiment. The sender, a user transmitting a message, transmits the message to the recipients via network 98. The sender's device identifies the device associated with the selected recipient. The sender's device sends the message through the network to the device(s) associated with the identified recipient(s) at Transmit Message 130. Users have the ability to lock their device for privacy. This locking capability allows users to use their device, headset, and speakers without interruption caused by other users sending messages.

The sender's device determines whether or not the recipient is in privacy mode at Recipient Locked 131. In one embodiment, the message is discarded such that the recipient in lock mode will not receive the message. The system does not transmit the message to the recipient's headset.

In another embodiment, the message is transmitted to Queue 132. Messages that are transmitted to Queue 132 are stored within the recipient's device. Recipients can access and play messages stored in Queue 132 through the application.

If the recipient is not locked, the sender's device transmits the message to the recipient's device. The recipient's device receives the message at Receive Message 134. The recipient's device then determines whether or not the recipient is playing music at Playing Music query 136. If the recipient's device is not playing music at Playing Music query 136, the recipient's device plays the message. The message could be played through the recipient's headset, headphones, speakers, or other audio playback. The recipient's headset, headphones, speakers, or other audio playback plays the message at Play Message 137. After the message is finished playing, the device then waits for the next message at Await Next Message 144.

If music is playing at Music Playing query 136, the recipient's device pauses the music at Pause Music 138. The recipient's device plays the message through the recipient's headset, headphones, speakers or other audio playback. The headset, headphones, speakers, or other audio playback play the message at Play Message 140. After the message plays, the recipient's device resumes playing the music at Resume Music 142. The device then awaits the next message at Await Next Message 144.

In one embodiment, the mobile computing device automatically plays the message without requiring an input from the recipient at Steps 137, 140. Traditionally, smart phones require a recipient to access a message. The system of the present invention automatically plays the audible message to the recipient without requiring the recipient to access the message. Such automatic playback of the audible message without input from the recipient enables real time playing of the message without requiring the recipient to stop whatever the recipient is currently doing. The recipient receives the audible message without any effort by the recipient.

FIG. 5 shows a flowchart of a user creating a group of users to send and receive audio messages. One embodiment of the system stores all groups in remote data storage, such as a database, that is accessible through the network. The group data may also be stored locally. Once a group is established, all members of a group may send messages to and receive messages from the other users of the group. Users may be associated with more than one group. If a user wishes to be disassociated from a group, the user may remove himself from a group through the application.

To create a group, the user must first identify the group at Identify Group 146 by naming the group. The group name can be a unique group so that the user can distinguish the different groups. The user must associate users of a group at Select Members 148.

Selecting the members of a group can be done in one of several ways. The available members may have a pre-established profile stored in the user information. The user creating the group can then enter the user information of the desired group member to add the user to the group. A user may also add a new member to the group by entering the contact information associated with the user to be added. For example, a user could add a member to the group by adding the contact information, which may include the member's cell phone number, email address, or other contact information.

After the user has Selected Members 148, the user must Save Group 150. Saving the group at Save Group 150 stores the group information and the associated members of the group. The system saves the identified group within the data storage described above. The data storage may be located remotely or locally on the devices. Once a group has been created, users may select the group as recipients as desired within the application. In one embodiment, only members of the established group may access and send messages to the group.

The system enables members to communicate with members of an organization. For example, members of a football team's defensive line may wish to communicate with each other through the system. Such communication is particularly useful in a weight room or workout scenario where users wish to communicate with each other without having to interrupt or otherwise delay their exercise regimen.

To create such a group, the user would first identify the group at Identify Group 146. The user could name the group "Defensive D-Line," or any other name that would identify the group. The user would then select the users to become members of the group at Select Members 148. The user enters the contact information or user name associated with each user to be identified as a member of the group. Once all desired members have been added, the user saves the group information at Save Group 150. A member of the defensive line communicates with the group by simply selecting the group as the recipient within the application.

Figure 6:
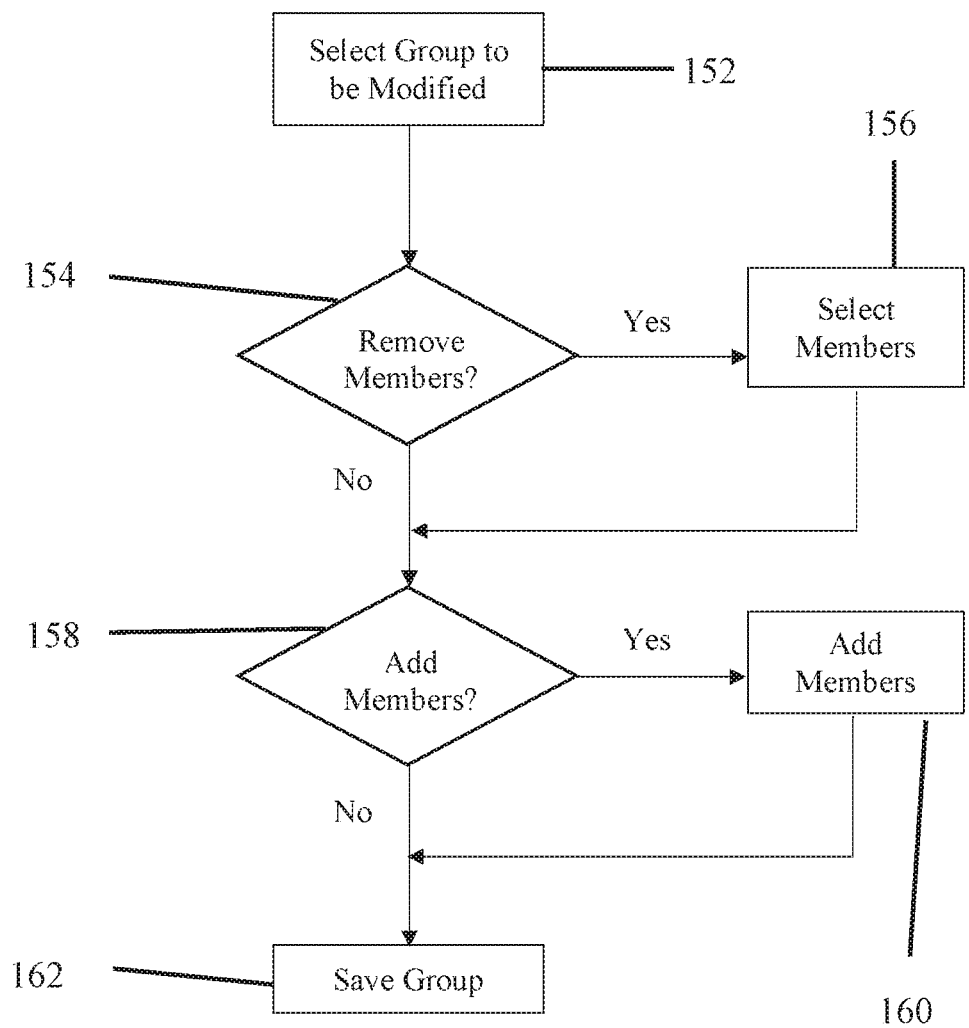
FIG. 6 is a flowchart showing a process of one embodiment of the present invention.

FIG. 6 shows a flowchart of a user modifying an existing group. In one embodiment, a select user is appointed as administrator of a group. In other embodiments, any member of a group can modify an existing group to which the member is associated. The application shows the groups to which the user is a member. To modify a group, the user must first select the group to be modified at Select Group to be Modified 152 within the application.

Once the user has selected the group, the user has two options. First, the user may remove a member at Remove Member 154. The user selects this option within the application. The application then shows the members of the selected group. The user may then Select Members 156 that the user wishes to remove from the selected group. Once the members to be removed are selected, the device removes the members from the group and returns to the group modification option.

The user may also add a member to the selected group at Add Member 158. The user selects this option within the application. Once the user selects this option, the member/administrator selects the users to add as members at Add Members 160. The member's device displays a screen with the option to add users. The user modifying the group can then enter the profile information or contact information of the user to be added to the selected group. The system then adds the user to the group. Once a user has added a member, the device returns to the group modification option.

The user can add and remove members as needed until the group contains the desired members. Once the group has the desired configuration, the user saves the group information at Save Group 162. Once the user saves the group modifications, the new group information is saved in a data storage that is accessible to devices. The new group configuration replaces the old group configuration.

FIG. 7 shows a sample diagram of user information stored in data storage, such as a database. The user information stores the Unique User ID, the user name, and contact information of each user. When a user creates an account, the system requires a unique user ID 164. The unique user ID may be a sign in name, email address, etc. The user inputs an ID of their choice into the application. Each Unique User ID 164 may be associated with only one user. If the user's desired Unique User ID is already associated with another user, the application will show an error message and prompt the user to pick another Unique User ID 164.

When the user creates an account, the user also has the option to enter his/her name in one embodiment. The user name 166 is stored in data storage. In another embodiment, the user name is required. The user enters User Name 166 through the application. The user information data storage also stores each user's contact information 168. The contact information associates each user with the user's device for communicating through the system. For example Jane Doe (Unique User ID JaneyD) is associated with the phone number 866-555-5555. The Unique User ID 164, User Name 166, and Communication Path 168 are all stored in a data storage that is accessible through the system.

FIG. 8 shows a sample diagram of a group information database. The database stores the group identifier 170, group description 172, and the members 174 of each group. The data storage associates the group identifier with the group description and the members of the group. When a group is first created, the user creating the group must create a Unique Group ID 170. Unique Group IDs may not be repeated. The user of one embodiment also has the option of providing a Group Description 172 associated with the group. In another embodiment, the group description is required.

Once a group is named and created, the user may add members to the group. The data storage, such as a database, associates the Unique User IDs 174 of each group member with the group. In one embodiment, the group identifier is associated with each member of the group. Once the group is created and saved, the application associates and stores the Unique Group ID 170, Group Description 172, and Unique User IDs 174 to the user information accessible through the network. The application accesses the user information to retrieve the group information and allow message transmission within the group.

FIG. 9 shows a sample diagram of additional user information accessible through Devices which identifies each user's messaging status. As was previously discussed, users have the ability to lock their device. In one embodiment, locking the device disallows messaging and discards the messages to a locked user. In another embodiment, locking the device sends all messages transmitted while the device is locked to a queue to be played later. The database stores the Unique User ID 176 and associates a Locked value 178 to the user. FIG. 9 shows JaneyD's device as locked. Any message sent to JaneyD individually or through a group will be sent to and stored in a queue. However, JDoe_79's device is not locked. JDoe_79 will receive any messages sent to him.

Users have the ability to see if another user's device is Locked 178 within the application before transmitting a message. The application may identify that the recipient has locked his device such that the message will not be immediately received. The sender may be notified via an audible warning or through visual warning on the device. The system informs the sender that the recipient has not received the message.

The user receives and transmits messages through a mobile computing device such as a smart phone, tablet, or a cell phone. The audio playback device implemented in the user's headphones or mobile computing device delivers the message from the mobile computing device to the user.

To transmit a message, the user enters the talk command into the command input. The user enters the talk command via a physical button on the headphones or a virtual button on the mobile computing device. The user speaks the message into the audio input implemented on the headphones or the mobile computing device. The audio input sends the message to the mobile computing device. The mobile computing device then transmits the message to the recipient(s).

In one embodiment, the communication system is implemented on a smart phone system. The system is programmed for a mobile device operating system. Such operating systems include, but are not limited to, IOS, Android, Windows Mobile, Windows 10 Mobile, BlackBerry 10, Firefox OS, Sailfish OS, Tizen, Ubuntu Touch OS, H5OS, and other mobile operating systems. Implemented on the smart phone, the system provides mobility to the user with functionality to operating the communication system. Furthermore, the system implemented on the smart phones enables the users to play music and communicate with others on a device that is normally carried by the user.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A communication method implemented on a mobile computing device that communicates with at least one mobile computing device of a user wherein the mobile computing device communicates with an audio input and an audio playback device, the method comprising:
   a command button of a set of personal headphones, the command button receiving a command input entered by the user;
   the personal headphones transmitting the command input to the mobile computing device;
   software installed on the mobile computing device that assigns the command input entered into the personal headphones via the command button to a talk command;
   the software identifying the command input and the software associating the command input with the talk command;
   the talk command indicating that the user is inputting a spoken message, wherein the user speaks the spoken message into the audio input after entering the talk command;
   the personal headphones transmitting the spoken message to the user's mobile computing device;
   the user's mobile computing device transmitting the message received from the personal headphones to the mobile computing device of at least one recipient;
   the user's mobile computing device stops transmitting the spoken message from the personal headphones to the user's mobile computing device after the user enters a second command input for a finish command to indicate that the message is completed;
   the user's mobile computing device ready to receive a message after the finish command is entered;
   a last correspondence record indicating the last correspondence of the user wherein the last correspondence record maintains the identity of the recipients of the last correspondence, wherein the last correspondence record identifies the recipients of the last correspondence without identifying all contacts of the user;
   the software identifying all of the recipients of the last correspondence wherein the number of recipients is at least two recipients;
   the user's mobile computing device transmitting the message to all of the recipients identified by the last correspondence record by default without requiring the user to select the recipients of the message, wherein the mobile computing device identifies each recipient individually for transmission of the message to each recipient identified in the last correspondence record;
   wherein the mobile computing device, upon entry of the talk command, transmits the message by default to the recipients and a sender of the message last received by the user wherein the mobile computing device identifies each recipient individually for transmission of the message.

2. A communication method implemented on a mobile computing device that communicates with at least one mobile computing device of a user wherein the mobile computing device communicates with an audio input and an audio playback device, the method comprising:
   a command button of a set of personal headphones, the command button receiving a command input entered by the user;
   the personal headphones transmitting the command input to the mobile computing device;
   software installed on the mobile computing device that assigns the command input entered into the personal headphones via the command button to a talk command;
   the software identifying the command input and the software associating the command input with the talk command;
   the talk command indicating that the user is inputting a spoken message, wherein the user speaks the spoken message into the audio input after entering the talk command;
   the personal headphones transmitting the spoken message to the user's mobile computing device;
   the user's mobile computing device transmitting the message received from the personal headphones to the mobile computing device of at least one recipient;
   the user's mobile computing device stops transmitting the spoken message from the personal headphones to the user's mobile computing device after the user enters a second command input for a finish command to indicate that the message is completed;
   the user's mobile computing device ready to receive a message after the finish command is entered;
   a last correspondence record indicating the last correspondence of the user wherein the last correspondence record maintains the identity of the recipients of the last correspondence, wherein the last correspondence record identifies the recipients of the last correspondence without identifying all contacts of the user;
   the software identifying all of the recipients of the last correspondence wherein the number of recipients is at least two recipients;
   the user's mobile computing device transmitting the message to all of the recipients identified by the last correspondence record by default without requiring the user to select the recipients of the message, wherein the mobile computing device identifies each recipient individually for transmission of the message to each recipient identified in the last correspondence record;
   the last correspondence record maintaining the identity of the sender of the last correspondence;
   the user's mobile computing device, upon entry of the talk command, transmitting the message to the sender associated with the last correspondence record in addition to all of the recipients associated with the last correspondence record by default without requiring the user to select each recipient of the message, wherein the mobile computing device identifies the sender associated with the last correspondence record individually for transmission of the message.

3. A communication method implemented on a smart phone of a sender that communicates with at least one smart phone of a recipient wherein the smart phones communicate with an audio input and an audio playback device, the method comprising:
   a set of personal headphones worn by the sender;
   a command button located on the headphones;
   a command input entered into the command button wherein the command input provides instruction to software installed on the sender's smart phone;
   the personal headphones transmitting the command input to the sender's smart phone to be processed by the software;
   the software assigning the command input to a talk command, wherein upon receipt of the talk command, the software activates the audio input to transmit a spoken message received after the talk command is entered into the command button;
   the software identifying the command input and the software associating the command input with the talk command;
   the sender entering the talk command into the command button of the headphones;
   the personal headphones transmitting the talk command to the sender's smart phone;
   the software receiving the command input from the headphones and the software determining that the command input is the talk command wherein the sender speaks an audible message into the audio input after entering the talk command;
   the audio playback device implemented on a pair of headphones wherein the headphones communicate with the sender's smart phone;
   the audio input implemented on the pair of headphones wherein the audio input communicates with the sender's smart phone;
   the sender's smart phone stops transmitting any audible message received by the audio input after the sender enters a second command input indicating a finish command that the message is completed;
   the personal headphones transmitting the finish command to the sender's smart phone;
   the personal headphones transmitting the audible message to the sender's smart phone;
   the sender's smart phone identifying recipients to which the message will be transmitted;
   the sender's smart phone transmitting the message to the recipient's smart phone; and
   the recipient's smart phone playing the audible message to the user upon receiving the message without requiring the recipient to access the audible message prior to playing the audible message, wherein the recipient's smart phone plays music prior to receiving the audible message and the recipient's smart phone resuming to play music after playing the audible message;
   the sender's smart phone ready to receive a message after the finish command is entered wherein the sender's smart phone will not play a message while the sender is inputting the audible message,
   a last correspondence record indicating the last correspondence of the user wherein the last correspondence record maintains the identity of the recipients of the last correspondence, wherein the last correspondence record identifies the recipients of the last correspondence without identifying all contacts of the user;
   the software identifying all of the recipients of the last correspondence wherein the number of recipients is at least two recipients;
   upon default entry of the talk command without the sender identifying recipients of the message, the user's mobile computing device transmitting the message to all of the recipients identified by the last correspondence record by default, wherein the mobile computing device identifies each recipient individually and transmits the message to each recipient identified in the last correspondence record;
   the last correspondence record maintaining the identity of the sender of the last correspondence;
   upon default entry of the talk command without the sender identifying recipients of the message, the sender's smart phone transmitting the message to the sender associated with the last correspondence record by default and to all additional recipients associated with the last correspondence record by default, wherein the sender's smart phone identifies all of the recipients and the sender associated with the last correspondence record individually for transmission of the message, wherein the sender's mobile computing device transmits the message individually to each recipient and the sender associated with the last correspondence record identified in the last correspondence record.

* * * * *